United States Patent
Willumstad et al.

(10) Patent No.: US 10,239,998 B2
(45) Date of Patent: Mar. 26, 2019

(54) MOISTURE CURABLE POLYMER SYSTEMS BASED ON A MIXTURE OF POLYSILYLATED POLYETHERS

(71) Applicant: Dow Global Technologies LLC, Midland, MI (US)

(72) Inventors: Thomas Willumstad, Pearland, TX (US); Subodh P. Jagtap, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/533,364

(22) PCT Filed: Dec. 5, 2015

(86) PCT No.: PCT/US2015/064149
§ 371 (c)(1),
(2) Date: Jun. 5, 2017

(87) PCT Pub. No.: WO2016/105915
PCT Pub. Date: Jun. 30, 2016

(65) Prior Publication Data
US 2017/0369648 A1 Dec. 28, 2017

Related U.S. Application Data

(60) Provisional application No. 62/095,601, filed on Dec. 22, 2014.

(51) Int. Cl.
| | | |
|---|---|---|
| *C08G 65/336* | (2006.01) | |
| *C08G 18/28* | (2006.01) | |
| *C08G 65/333* | (2006.01) | |
| *C08L 101/10* | (2006.01) | |
| *C08G 65/334* | (2006.01) | |

(52) U.S. Cl.
CPC ......... *C08G 65/336* (2013.01); *C08G 18/283* (2013.01); *C08G 18/289* (2013.01); *C08G 65/3348* (2013.01); *C08G 65/33348* (2013.01); *C08L 101/10* (2013.01)

(58) Field of Classification Search
CPC ............ C08G 18/5036; C08G 18/5045; C08G 18/283
See application file for complete search history.

(56) References Cited

U.S. PATENT DOCUMENTS

| | | |
|---|---|---|
| 6,833,423 B2 | 12/2004 | Roesler |
| 8,394,909 B2 | 3/2013 | Porsch |
| 2011/0218137 A1 | 9/2011 | Holger |
| 2013/0090429 A1* | 4/2013 | Zhang ................... C08G 18/10 524/590 |
| 2013/0102738 A1 | 4/2013 | Volker |

FOREIGN PATENT DOCUMENTS

| | | |
|---|---|---|
| WO | 2010/126937 A | 11/2010 |
| WO | 2011/150161 A | 12/2011 |
| WO | 2012/003187 A | 1/2012 |
| WO | 2012/003216 A | 1/2012 |
| WO | 2013/048806 A | 4/2013 |

* cited by examiner

*Primary Examiner* — Kuo Liang Peng

(57) ABSTRACT

Low viscosity mixtures of polysilylated polyethers are described. The mixtures include a) 50 to 95 weight percent of one or more first polysilylated polyethers which are free of urea groups, have an average of two or more terminal hydrolysable silyl groups per molecule and have a molecular weight of 4,000 to 20,000 and 50 to 5 weight percent of one or more second polysilylated polyethers which are free of urea groups, have an average of 1.8 to 4 terminal hydrolysable silyl groups per molecule and have a molecular weight of 1000 to less than 400. The mixtures have surprisingly low viscosities, and are useful as curable components of adhesive, sealant, caulking and/or coating compositions.

12 Claims, No Drawings

MOISTURE CURABLE POLYMER SYSTEMS BASED ON A MIXTURE OF POLYSILYLATED POLYETHERS

This invention relates to moisture curable polymer systems.

Moisture-curable polymer systems are used in applications like sealants, adhesives, caulks and coatings. The formulated systems include one or more polymer precursors that react with water after being applied to form a cured polymer system. This mechanism allows the system to be applied as a viscous fluid that then hardens in place.

One type of polymer precursor used in these applications is a silylated material having hydrolysable silyl groups. These groups cure by reaction with water, producing Si—O—Si bonds between the molecules and liberating a reaction by-product which might be, for example, an alkanol such as ethanol or methanol or a hydrogen halide such as HCl.

One common type of silylated molecule is a polysilylated polyether. This material is a polyether having two or more terminal hydrolysable silane groups. These can be made in several ways. One method is to prepare the polyether, introduce terminal isocyanate groups onto it, and then cap the isocyanate by reaction with an aminosilane. The amino and isocyanate groups react to form a urea linkage that binds the silane to the polyether chain.

Precursors as just described are plagued with at least two significant problems. One is variability in the product. Unless carefully controlled, the isocyanate-capping reaction may be incomplete or may result in coupling of the polyether molecules. These events affect molecular weight, molecular weight distribution and functionality of the isocyanate-functionalized polyether. Similarly, the capping reaction with the aminosilane also can lead to product variability.

The second major problem is one of viscosity. Polysilylated polyethers formed in the foregoing manner have very high viscosities. For example, in U.S. Pat. No. 8,642,708, there is described a polysilylated polyether made by reacting a 425 molecular weight poly(oxypropylene) diol with toluene diisocyanate and then capping the resulting isocyanate-terminated polyether with N-phenylaminomethyl-methyldimethoxysilane. The product has a viscosity of almost 2000 Pa·s, which is by itself several times more viscous than is wanted in a sealant, adhesive, caulking compound or coating composition, even before it is formulated with other ingredients.

Because of these high viscosities, it is necessary to formulate the precursor with a diluent so the viscosity is reduced to a workable level. This can resolve the problem of viscosity, but leads to problems of other kinds. If the diluent is not reactive, and therefore does not participate in the cure, it can exude from the cured product over time, leading to staining, shrinkage, cracking, loss of physical properties, and similar problems. If reactive, the diluent can change the properties of the cured material in an undesirable way.

In an approach described in U.S. Pat. No. 8,642,708, the problem is addressed by blending two silylated polyethers together, one of which has a lower equivalent weight and the other of which is higher in equivalent weight, each of which contains hydrolysable silane groups and so can participate in the cure. The higher equivalent weight precursor has the lower viscosity, despite being a much larger molecule; this is believed to be due to its lower content of urea groups (per unit weight). Urea groups hydrogen bond strongly, and it is this hydrogen bonding which is believed to account for the high viscosity of the silylated polyethers of U.S. Pat. No. 8,642,708. The blending approach of U.S. Pat. No. 8,642,708 has only very limited effect—the viscosity is reduced from about 2,000 Pa·s only to about 755 Pa·s, which is still very high. This blended material is suitable for some caulking products, but its viscosity is still too high for many sealants, adhesives caulking compounds and/or coating compositions. Furthermore, this still-too-high viscosity precludes the incorporation of mineral fillers into the material. It is often desired to incorporate mineral fillers into sealant, adhesive caulking and coating compositions because the fillers reduce the overall cost of the material and in some cases can provide desirable rheological and other properties. Furthermore, the inclusion of the higher equivalent weight precursor itself affects the properties of the cured polymer, often in a very significant and undesirable way.

More recently, a new class of polysilylated polyethers has been developed. See, e.g., WO 2011/150161, WO 2012/003187 and WO 2012/003216. These polyethers are made use a different sequence of reactions than is described in U.S. Pat. No. 8,642,708, so the silyl groups are affixed to the polyether chain first instead of last. A polyether monol having a single site of vinyl unsaturation is reacted with a silylhydride that also has hydrolysable groups attached to the silicon atom. This produces a monosilylated polyether monol having a single silyl group and a single hydroxyl group. The monosilylated polyether monol is then coupled in one or more steps to produce the product. In WO 2012/003187 and WO 2012/003216, the coupling is performed by reacting the monosilylated polyether monol with a diisocyanate to form a monosilylated polyether monoisocyanate, which is then reacted with a polyol to couple the monoisocyanate molecules to form the final product. The product contains urethane groups, but is generally free of urea groups. These products have much lower viscosities than the urea-containing types described in U.S. Pat. No. 8,642,708. However, the viscosities are still high enough that it is difficult to produce highly-filled sealants or caulks from them.

What is needed is a moisture curable, polysilylated precursor material that has a low viscosity but which still cures to form a serviceable polymer.

In a first aspect, the invention is a moisture-curable polysilylated polyether composition comprising a mixture of polysilylated polyethers, wherein the mixture comprises a) 50 to 95 weight percent, based on the combined weights of a) and b), of one or more first polysilylated polyethers which are free of urea groups, have an average of two or more terminal hydrolysable silyl groups per molecule and have a molecular weight of 4,000 to 20,000, the first polysilylated polyether(s) being a reaction product of a i) linear polyether having a terminal isocyanate group, a terminal hydrolysable silyl group and a number average molecular weight of 250 to 2000 and (ii) a polyether polyol nominally having 2 to 6 hydroxyl groups per molecule and a hydroxyl equivalent weight of 500 to 2500; and b) 50 to 5 weight percent, based on the combined weights of a) and b), of one or more second polysilylated polyethers which are free of urea groups, have an average of 1.8 to 4 terminal hydrolysable silyl groups per molecule and have a molecular weight of 1000 to less than 4,000, the second polysilylated polyether(s) being a reaction product of i) a linear monosilylated polyether monol having a terminal hydroxyl group, a terminal hydrolysable silyl group and a molecular weight of 250 to 1500 and ii) a coupling agent having at least two groups reactive with hydroxyl groups and a molecular weight of up to 500.

This mixture has a surprisingly low viscosity. The viscosity of the mixture is often low enough that it can be highly filled with a mineral filler to produce a formulated curable composition that remains easily flowable. Furthermore, the presence of component b) has been found to have only a small effect on the curing of the mixture and on the properties of the cured mixture, despite its much lower molecular weight.

The invention is also a filled moisture-curable composition, comprising the foregoing mixture of polysilylated polyethers and at least 5 weight percent, based on the weight of the mixture of polysilylated polyethers, of a particulate mineral filler.

The invention is also a first method for making a mixture of polysilylated polyethers, comprising the steps of A) forming a mixture of:

starting material 1): one or more first polysilylated polyethers free of urea groups, having an average of two or more terminal hydrolysable silyl groups per molecule and having a molecular weight of 4,000 to 20,000, the first polysilylated polyether(s) being a reaction product of a i) linear monosilylated polyether isocyanate having a terminal isocyanate group, a terminal hydrolysable silyl group and a molecular weight of 500 to 2000 and (ii) at least one polyether polyol nominally having 2 to 6 hydroxyl groups per molecule and a hydroxyl equivalent weight of 500 to 2500;

starting material 2): at least one linear monosilylated polyether monol having a terminal hydroxyl group, a terminal hydrolysable silyl group and a molecular weight of 250 to 1500; and starting material 3): at least one coupling agent having at least two groups reactive with hydroxyl groups and a molecular weight of up to 500; and B) reacting starting material 2 and 3) in the presence of starting materials 1) to produce a mixture of starting material 1) and at least one second polysilylated polyether having a molecular weight of 1000 to less than 4000 and corresponding to a reaction product of starting material 2) with starting material 3).

The invention is also a second method for making a mixture of polysilylated polyethers, comprising the steps of I. Forming a first reaction mixture containing at least one starting linear monosilylated polyether monol having a terminal hydroxyl group, a terminal hydrolysable silyl group and a molecular weight of 250 to 1500 and at least one polyisocyanate having at least two isocyanate groups and a molecular weight of up to 500, the linear monosilylated polyether monol and polyisocyanate being provided in amounts such that greater than one equivalent of isocyanate groups is provided per equivalent of hydroxyl groups on the linear monosilylated polyether monol;

II) reacting the first reaction mixture from step I to form a reaction product containing i) at least one linear monosilylated polyether isocyanate having a terminal isocyanate group, a terminal hydrolysable silyl group and a molecular weight of 500 to 2000 and ii) a polysilylated polyether having at least two terminal hydrolysable silyl groups and a molecular weight of 1000 to less than 4000, which polysilylated polyether lacks isocyanate groups and corresponds to a reaction product of the polyisocyanate with one molecule of the starting linear polyether per isocyanate group of the starting polyisocyanate;

(III) combining the reaction product formed in step II with at least one polyether polyol nominally having 2 to 6 hydroxyl groups per molecule and a hydroxyl equivalent weight of 500 to 2500 to form a second reaction mixture, and (IV) reacting the polyether polyol(s) and the linear monosilylated polyether isocyanate in the second reaction mixture in the presence of the polysilylated polyether formed in step II to produce the mixture of polysilylated polyethers.

First Aspect of the Invention

Component a) of the mixture of the first aspect of the invention is one or more first polysilylated polyethers free of urea groups. The first polysilylated polyether(s) have in each case an average of two or more terminal hydrolysable silyl groups per molecule and a molecular weight of 4,000 to 20,000 g/mol. These molecular weights and all other molecular equivalent weights described herein are number average weights expressed as grams/mole, unless otherwise indicated. The first silylated polyether(s) constitute 50 to 95 weight percent, based on the combined weights of components a) and b), and may constitute, for example 60 to 90 weight percent thereof.

The first polysilylated polyether(s) may in each case have a number average molecular weight of at least 5,000 or at least 6,000, and may in each case have a number average molecular weight of up to 15,000 or up to 13,000. In some embodiments, the first polysilylated polyether(s) in each case may have, for example, at least 3 hydrolysable silyl groups per molecule. For purposes of this invention, a "hydrolysable" silyl group is a silyl group having at least one hydrolysable substituent bonded directly to the silicon atom, which upon reaction with water forms a silanol group (which may react further to form an Si—O—Si linkage). In specific embodiments, each first polysilylated polyether has an average of 2 to 6, 3 to 6 or 3 to 4 hydrolysable silyl groups per molecule.

The first polysilylated polyether(s) are a reaction product of a i) linear monosilylated polyether isocyanate having a terminal isocyanate group, a terminal hydrolysable silyl group and a molecular weight of 500 to 2000 with (ii) a polyether polyol nominally having 2 to 6 hydroxyl groups per molecule and a hydroxyl equivalent weight of 500 to 2500. The linear monosilylated polyether isocyanate is conveniently prepared by silylating a polyether monol having terminal ethylenic unsaturation (i.e., a —CR=CH$_2$ group, where R is an inert substituent such as hydrogen or lower alkyl, "inert" here meaning it does not react under the conditions of the reaction that forms the monosilylated polyether monol) to form a monosilylated polyether monol, and then capping the silylated polyether monol with a polyisocyanate, preferably a diisocyanate. Processes for making the silylated polyether monol, for capping the silylated polyether monol and forming the first polysilylated polyether(s) include those described, for example, in WO 2011/150161, WO 2012/003187 and WO 2012/003216.

The polyether monol having terminal ethylenic unsaturation is conveniently formed by adding one or more alkylene oxides to an ethylenically unsaturated alcohol such as, for example, vinyl alcohol, allyl alcohol, methallyl alcohol, trimethylolpropane monoallyl ether, trimethylolpropane diallyl ether, glycerol monoallyl ether, glycerol diallyl ether, hydroxyethyl acrylate, hydroxyethyl methacrylate, a hydroxyl-terminated polybutadiene, and the like. The alkylene oxide is preferably ethylene oxide, 1,2-propylene oxide, 1,2-butylene oxide or a mixture of any two or more thereof. The polyether monol most preferably is a polymer of 1,2-propylene oxide or a random and/or block copolymer of a mixture of 50-99.5 weight-% (preferably 70-99.5 weight-%) 1,2-propylene oxide and 0.5-50 weight-% (preferably 0.5 to 30 weight-%) ethylene oxide.

The polyether monol may be silylated by reaction with a hydrolysable silyl hydride. The hydrolysable silyl hydride has at least one, preferably exactly one, silicon-hydrogen bond, and at least one hydrolysable substituent bonded directly to a silicon atom. There may be, for example, 1 to 8, 1 to 6, 2 to 6 or 2 to 4 hydrolysable substituent(s). The hydrolysable substituent(s) may be, for example, a halogen (such as chlorine), alkoxy, acyloxy, ketoximato, amino, amido, acid amide, aminoxy, mercapto or alkenyloxy. Alkoxy substituent(s) are preferred among these. Suitable hydrolysable silyl hydride compounds include the compounds described in paragraphs [0025]-[0028] of WO 2012/003216. Specific hydrolysable silyl hydride compounds include trichlorosilane, methyl dichlorosilane, dimethylchlorosilane, phenyldichlorosilane, trimethylsiloxymethylchlorosilane, 1,1,3,3-tetramethyl-1-bromodisiloxane, trimethoxysilane, triethoxysilane, methyldiethoxysilane, methyldimethoxysilane, phenyldimethoxysilane, trimethylsiloxymethylmethoxysilane, trimethylsiloxydiethoxysilane, methyldiacetoxylsilane, phenyldiacetoxysilane, triacetoxy silane, trimethylsiloxymethylacetoxysilane, trimethylsiloxydiacetoxysilane, bis(dimethyl ketoximato)methylsilane, bis(cyclohexyl ketoximato)methylsilane, bis(diethyl ketoximato)trimethylsiloxysilane, bis (methyl ethyl ketoximato) methylsilane, tris(acetoxamato)silane and methylisoroppenyloxysilane. Among these, methyldimethoxysilane, trimethoxysilane, methyldiethoxysilane, triethoxysilane, trichlorosilane and methyldichlorosilane are preferred on the basis of favorable reactivity and ease of handling. The hydrolysable silyl hydride reacts across the carbon-carbon double bond of the ethylenically unsaturated group of the polyether monol to introduce the terminal hydrolysable silyl group.

The polyisocyanate used to cap the monosilylated polyether monol may be aliphatic or aromatic. It preferably is a diisocyanate, although polyisocyanate compounds having higher isocyanate functionalities can be used. Examples of useful polyisocyanates include toluene diisocyanate, diphenylmethane diisocyanate, m-phenylene diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2, 4-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, and the like.

The polyether polyol used to make the first polysilylated polyether nominally has 2 to 6 hydroxyl groups per molecule and has a hydroxyl equivalent weight of 500 to 2500. Preferably, it nominally has 2 to 6, 3 to 6 or 3 to 4 hydroxyl groups per molecule. The "nominal" number of hydroxyl groups of a polyether polyol refers to the number of oxyalkylatable sites on the initiator compound(s) used to make the polyether polyol. The actual number of hydroxyl groups per molecule tends to be somewhat lower than the nominal value due to side-reactions that occur in the manufacturing process. The hydroxyl equivalent weight of the polyether polyol may be, for example, 800 to 2500, 1000 to 2200 or 1300 to 1800. The polyether polyol in some embodiments is a polymer of 1,2-propylene oxide or random and/or block copolymer of a mixture of 50-99.5 weight-% (preferably 70-99.5 weight-%) 1,2-propylene oxide and 0.5-50 weight-% (preferably 0.5 to 30 weight-%) ethylene oxide.

The polyether polyol may be the continuous liquid phase of a "polymer polyol", which is a dispersion of polymer particles in a continuous liquid polyol phase. In such a case, the dispersed polymer particles may be at least partially grafted to some or all of the liquid polyol molecules. The "solids", i.e., the weight of the dispersed polymer particles based on the total weight of the polymer polyol, may be, for example, 2 to 50%, preferably 5 to 40% by weight. The dispersed polymer particles may be polyurethane, polyurea, polyhydrazide, polystyrene, styrene-acrylonitrile, or the like. In determining hydroxyl equivalent weight of such a polymer polyol, the weight of the dispersed particles is not taken into account.

In some embodiments, polysilylated polyether component a) is one or more compounds represented by the structure (I):

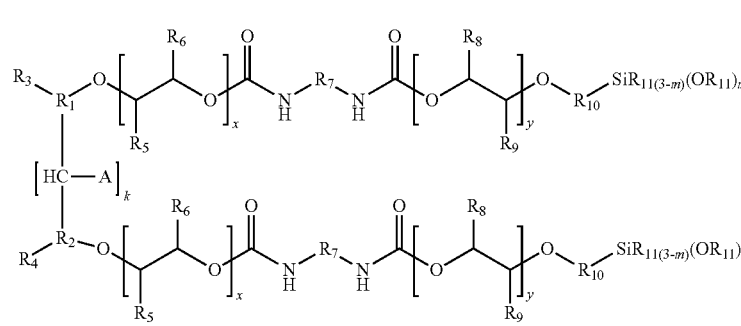

where A is either H or has the structure (II):

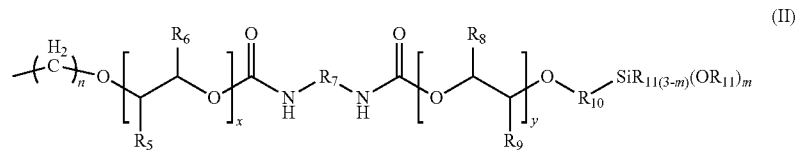

k is a number from 0 to 4, m and n are independently numbers from 0 to 3, the values of x and y are such that the compound has a molecular weight as described above, $R_1$, $R_2$, $R_{10}$ and $R_{11}$ are independently straight chain or branched alkyl groups having 1 to 4 carbon atoms, $R_3$, $R_4$, $R_5$, $R_6$, $R_8$ and $R_9$ are independently hydrogen or straight chain or branched alkyl groups having 1 to 4 carbon atoms, and $R_7$ is aliphatic, cycloaliphatic, bis-benzylic and/or aromatic and has 2 to 20 carbon atoms.

Component b) of the mixture of the first aspect is one or more second polysilylated polyethers free of urea groups. The second polysilylated polyether(s) in each case has an average of 1.8 to 4 terminal hydrolysable silyl groups per molecule, and a number average molecular weight of 1000 to less than 4000. Component b) constitutes 50 to 5 weight percent of the combined weights of components a) and b), and in some embodiments constitutes 40 to 10 weight percent thereof.

The second polysilylated polyethers in each case may have a number average molecular weight of at least 1,200 or at least 1,500, and may have a number average molecular weight of up to 3,000 or up to 2,500. In some embodiments, the second polysilylated polyether(s) may in each case have, for example, an average of 1.8 to 4, 1.8 to 3, 1.8 to 2.5 or 1.8 to 2.2 hydrolysable silyl groups per molecule.

The second polysilylated polyether(s) is a reaction product of i) a linear monosilylated polyether monol having a terminal hydroxyl group, a terminal hydrolysable silyl group and a molecular weight of 250 to 1500 and ii) a coupling agent having at least two groups reactive with hydroxyl groups and a molecular weight of up to 500. The linear monosilylated polyether monol can be made by silylating a starting polyether monol having an ethylenically unsaturated group, as described before. The silylation reaction can be performed as described above with respect to component a), and the silylating agents described there are useful.

The coupling agent may have, for example, two or more isocyanate, carboxylic acid, carboxylic acid halide, or epoxide groups. It preferably has an average of 1.8 to 4, 1.8 to 3, 1.8 to 2.5 or 1.8 to 2.2 groups that react with hydroxyl groups. The most preferred coupling agents are diisocyanates as described above.

The ratio of coupling agent to monosilylated polyether monol may be such that approximately one equivalent (such as from 0.8 to 1.25 equivalents, 0.9 to 1.1 equivalents, 0.95 to 1.05 equivalents or 0.98 to 1.02 equivalents) of hydroxyl-reactive groups are provided by the coupling agent per equivalent of hydroxyl groups provided by the monosilylated polyether monol. The coupling is performed such that the hydroxyl-reactive groups of the coupling agent are consumed by reaction with hydroxyl groups of the monosilylated polyether monol to form the second polysilylated polyether. Reaction conditions are selected such that this coupling reaction occurs and will in any particular case depend to some extent on the particular hydroxyl-reactive groups. Reaction conditions may include, for example, an elevated temperature, the presence of a catalyst, the removal of reaction by-products (if any) and the like.

In some embodiments, the second polysilylated polyether is one or more compounds represented by the structure:

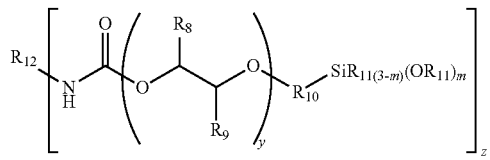

wherein $R_8$, $R_9$, $R_{10}$, $R_{11}$ and y are as described before with regard to Structure I, $R_{12}$ is the residue, after removal of isocyanate groups, of a polyisocyanate having z isocyanate groups and a molecular weight of up to 500, and z has an average value of 1.8 to 4, 1.8 to 3, 1.8 to 2.5, or 1.8 to 2.2.

The mixture of components a) and b) has a surprisingly low viscosity, particularly in comparison with urea group-containing silylated polyethers as described in U.S. Pat. No. 8,642,708. The viscosity of the mixture is generally less than 100 Pa·s and is often in the range of only 5 to 50 Pa·s, 5 to 30 Pa·s or 10 to 30 Pa·s at 25° C., as measured on a parallel plate rheometer with 50 mm plates and a shear rate of 1/s.

Methods of Making the Mixture of Polysilylated Polyethers

The foregoing first and second polysilylated polyethers can be made separately and then mixed together to form the mixture of the first aspect of the invention. In such a case, simple mixing at any temperature at which the first and second polysilylated polyethers are liquid is sufficient, although if desired the respective polysilylated polyethers can be blended while dissolved in a solvent.

In some embodiments, this invention is a first method for making a mixture of polysilylated polyethers. In this first method, a first polysilylated polyether as described before (designated here as starting material 1) for convenience) is mixed with at least one linear monosilylated polyether monol having a terminal hydroxyl group, a terminal hydrolysable silyl group and a molecular weight of 250 to 1500 (starting material 2)) and a coupling agent having at least two groups reactive with hydroxyl groups and a molecular weight of up to 500 (starting material 3)). Starting materials 2) and 3) are then reacted in the presence of component 1) to form the second polysilylated polyether. In this way, the mixture of silylated polyethers is produced as soon as starting materials 2) and 3) react to form the second polysilylated polyether.

In this first method, the proportions of starting materials 2) and 3) may be such that approximately one equivalent (such as from 0.8 to 1.25 equivalents, 0.9 to 1.1 equivalents, 0.95 to 1.05 equivalents or 0.98 to 1.02 equivalents) of hydroxyl-reactive groups are provided by the coupling agent per equivalent of hydroxyl groups provided by the monosilylated polyether monol. The proportions of starting materials 1), 2) and 3) are selected together such that upon reaction of starting material 2) with starting material 3) to form the second polysilylated polyether, the weight ratio of the first and second polysilylated polyethers in the resulting mixture is as described before.

In this first method, the conditions for reaction of starting materials 2) and 3) are generally as described above with respect to the preparation of the second polysilylated polyether.

In a second method for making a mixture of polysilylated polyethers, the first and second polysilylated polyethers are prepared simultaneously. In this second method, at least one starting linear monosilylated polyether monol having a terminal hydroxyl group, a terminal hydrolysable silyl group and a molecular weight of 250 to 1500 and at least one polyisocyanate having at least two isocyanate groups and a molecular weight of up to 500 are combined to form a first reaction mixture, and then reacted together.

The equivalent ratios of the starting materials are such more than one equivalent of isocyanate groups is provided per equivalent of hydroxyl groups. The equivalent ratio of isocyanate groups to hydroxyl groups may be, for example, 1.05:1 to 1.9:1, or 1.1 to 1.75, or 1.25 to 1.75 or 1.4 to 1.6 in specific embodiments. At these equivalent ratios, the starting materials react to form a mixture of reaction products.

A portion of the starting materials reacts to form linear monosilylated polyether isocyanates, characterized in having a terminal isocyanate group and a terminal hydrolysable silyl group. These linear monosilylated polyether isocyanates have a molecular weight of 500 to 2000, and primarily correspond to the reaction product of one molecule of the polyisocyanate and one molecule of the starting linear monosilylated polyether monol.

In addition, a portion of the starting materials reacts to form a polysilylated polyether that lacks isocyanate groups and has two or more terminal hydrolysable silyl groups (i.e., the "second" silylated polyether described before). This corresponds to a reaction product of a molecule of the starting polyisocyanate and two or more molecules of the starting linear monosilylated polyether monol.

Some small quantity of the starting materials may react to form oligomeric species having terminal hydrolysable silyl groups, corresponding to the reaction product of three or more molecules of the starting linear polyether and at least two molecules of the starting polyisocyanate.

The resulting mixture of materials is then combined with a polyether polyol that nominally has 2 to 6 hydroxyl groups per molecule and a hydroxyl equivalent weight of 500 to 2500, to form a second reaction mixture. The polyether polyol may be a polymer polyol as described before. Upon reaction of this second reaction mixture, the polyether polyol reacts with the terminal isocyanate groups of the monosilylated polyether isocyanate(s) to form polysilylated polyether(s), thus producing the first polysilylated polyether(s) in the presence of the second polysilylated polyether(s).

Uses for the Mixture of Polysilylated Polyethers

The mixture of polysilylated polyethers is curable through reaction with water to form a high molecular weight polymer. As such, the mixture is useful to form a wide range of polymeric materials, including, for example: cast elastomers, which may be molded or otherwise formed into a particular shape for use in a specialized applications; adhesives; sealants and caulks. The viscosity of the mixture of polysilylated polyethers is well within acceptable limits for a formulated adhesive, sealant, caulking or coating formulation. In many cases, the formulation can tolerate a significantly higher viscosity that that of the mixture of polysilylated polyethers by itself. In such cases, one or more additives that increase the viscosity, such as mineral fillers, can be added to the mixture of polysilylated polyethers in formulating the adhesive, sealant or caulk product. The ability to add mineral fillers to the mixture of polysilylated polyethers while still maintaining a suitable viscosity for use as an adhesive, sealant, caulking or coating composition is a very significant advantage of the invention. The cheaper filler reduces the cost per unit volume, and often adds stiffness or other desirable rheological properties to the uncured formulation. The mineral filler can also impart desirable characteristics to the cured material; these include, for example (and depending on the particular filler selected), resistance to shrinkage; flame resistance; smoke abatement, coloration; density, and others.

Thus, in a further aspect, the invention is a formulated curable composition that comprises a mixture of polysilylated polyethers as described herein and at least 5 weight percent, based on the weight of the polysilylated polyethers, of at least one particulate mineral filler. The amount of particulate mineral fillers may be at least 10, at least 15% or at least 25%, of the weight of the polysilylated polyethers, and may be as much as 75%, 50%, 40% or 30% thereof.

The mineral may be, for example, glass, sand, clay, calcium carbonate, mica, metal particles, silicon dioxide, talc, wollastonite, fly ash, various forms of carbon or other inorganic material. Any of such fillers may be surface-modified with, for example, an amino-vinyl-, or alkylsilane or other coupling agent or surface treatment. The mineral is in the form of particles that have a largest dimension of 50 nm to 100 µm. The particles may have an aspect ratio (ratio of longest to shortest dimension) of, for example, 1 to 10, 1 to 5 or 1.2.

A formulated curable composition may contain one or more other components as may be useful for the specific application. If a lower viscosity it wanted, one or more solvents or diluents can be present. The composition may contain one or more of a colorant; a preservative; a biocide; an antioxidant; one or more other polymers; one or more curing agents; and one or more curing catalysts.

The formulated curable composition can be applied to a substrate in any useful way, and cured in place to form an adherent bond to the substrate. It is generally desirable that the formulated curable composition has a viscosity of 5 to 1000 Pa·s, so it resists running off under force of gravity or washing off until it has cured. In specific embodiment, the viscosity is up to 500 or up to 300 Pa·s. The substrate may be any material to which the cured composition forms an adhesive bond. If formulated as an adhesive, the curable composition is applied between two substrates that are to be bonded. If formulated as a sealant or caulk, the curable composition is applied at a joint or crack in a substrate or at the junction between two or more substrates where sealing is desired. It is often convenient to package the adhesive into a tube or other container, and to apply the adhesive from the tube or other container using a caulk gun or similar apparatus.

Curing is performed by exposing the mixture of polysilylated polyethers to water, which can be present in liquid form or as water vapor. The water may be supplied in the form as atmospheric moisture. The curing reaction proceeds spontaneously at room temperature in most cases; however, elevated temperatures may be used to speed the cure if desired.

Similarly, the cure often proceeds well without a catalyst, but one may be provided if a faster cure is wanted. Silanol condensation catalysts include, for example, titanic acid esters such as tetrabutyl titanate, tetrapropyl titanate and the like; tin compounds such as dibutyltin dilaurate, dibutyltin maleate, dibutyltin diacetate, tin octylate, tin napthenate, dialkyl tin diacetylacetonate, dialkyltin oxides, organoaluminum compounds such as aluminum trisacetylacetonoate and aluminum trisethylacetonate; various bismuth carboxylates; various chelated zirconium and titanium compounds, and various amines such as butylamine, octylamine, dibutylamine, monoethanolamine, diethanolamine, triethanolamine, diethylenetriamine, cyclohexylamine, benzylamine and the like. Such a catalyst, if used at all, may be present in an amount from 0.1 to 10 parts by weight per 100 parts by weight of the mixture of polysilylated polyethers.

The following examples are provided to illustrate the invention, but are not intended to limit the scope thereof. All parts and percentages are by weight unless otherwise indicated. In the following Examples:

Base Resin 1 is a "first" polysilylated polyether. It is free of urea groups, has an average of approximately three terminal hydrolysable silyl groups per molecule and a number average molecular weight of 11,400. Base Resin 1 is the reaction product of a i) linear polyether having a terminal isocyanate group, a terminal hydrolysable silyl group and a number average molecular weight of 250 to 2000 and (ii) a polyether polyol nominally having 3 hydroxyl groups per molecule and a hydroxyl equivalent weight of about 2040. The linear polyether having a terminal isocyanate group is made by silylating an ethylenically 800 molecular weight polyether monol with $HSiCH_3(OCH)_2$ and then capping the resulting monosilylated polyether monol with 4,4-diphenylmethanediisocyanate. Base Resin 2 has a viscosity of 11.7 Pa·s at 25° C.

Base Resin 2 is also a "first" polysilylated polyether. It is made in the same general manner as Base Resin 1, except the polyether polyol in this case is a 2550 hydroxyl equivalent weight dispersion of 40 weight % styrene-acrylonitrile particles in the polyether polyol, which replaces the polyether polyol used to make Base Resin 2 on an equivalent-by-equivalent basis. The number average molecular weight of Base Resin 2, disregarding the weight of the styrene-acrylonitrile particles, is approximately 8000 to 12000. Base Resin 2 has a viscosity of 28 Pa·s at 25° C.

The Silylated Polyether Monol is made in a reaction of methyl(dimethoxy)silane hydride with an 800 molecular weight poly(propylene glycol) monoallyl ether.

EXAMPLE 1

119 g of the Silylated Polyether Monol are heated to 55° C. under nitrogen, with stirring. A drop of dibutyltin dilaurate catalyst and 1 equivalent of 4,4'-methylene diphenyl diisocyanate (MDI) per equivalent of Silylated Polyether Monol are added, taking care to prevent excessive exotherm. The mixture is then heated to 78° C. until the isocyanate groups have disappeared as indicated by infrared analysis. The product is a "second" polysilylated polyether, corresponding to the reaction product of one molecule of the MDI with two molecules of the Silylated Polyether Monol. It has a number average molecular weight of approximately 2050. Its viscosity is about 1.4 Pa·s at 25° C.

38 parts of the resulting product are blended with 62 parts of Base Resin 1 to form a mixture of polysilylated polyethers in accordance with the invention.

EXAMPLES 2 AND 3

Example 2: 250 g of Base Resin 1 are heated under nitrogen to 55° C. with stirring. 19 g of a mixture of the 2,4'- and 4,4'-isomers of diphenylmethane diisocyanate are added, followed by 146.2 g of the Silylated Polyether Monol. This mixture is stirred at 75° C. until the isocyanate groups have disappeared as indicated by infrared analysis. The product is a mixture of 60 weight percent of Base Resin 1, and 40 weight percent of a "second" polysilylated polyether corresponding to the reaction product of one molecule of the MDI with two molecules of the Silylated Polyether Monol. The mixture has a viscosity of about 6.8 Pa·s at 25° C.

Example 3: 200.4 g of Base Resin 2 are heated under nitrogen to 55° C. with stirring. 3.75 g of a 4,4'-diphenylmethane diisocyanate are added, followed by 27.9 g of the Silylated Polyether Monol. This mixture is stirred at 75° C. until the isocyanate groups have disappeared as indicated by infrared analysis. The product is a mixture of 86 weight percent of Base Resin 1 and 14 weight percent of a "second" polysilylated polyether. The second polysilylated polyether corresponds to the reaction product of one molecule of the MDI with two molecules of the Silylated Polyether Monol. The mixture has a viscosity of about 20 Pa·s at 25° C.

Examples 2 and 3 are separately mixed with 0.5 weight-percent dibutyltin bis(acetylacetonate) on a high-speed laboratory mixer. The resulting mixtures each are cast onto a polyethylene sheet using a 25 mil (0.65 mm) drawdown bar and cured at 23° C. and 50% relative humidity for 7 days. Tensile strength and elongation are measured according to ASTM D-1708. Results are as indicated in Table 1. For comparison, Base Resins 1 and 2 are evaluated separately.

TABLE 1

| Designation | Viscosity, Pa · s | Tensile Strength, kPa (psi) | Elongation, % |
|---|---|---|---|
| Base Resin 1 | 11.7 | 614 (89) | 144 |
| Example 2 | 6.8 | 786 (114) | 119 |
| Base Resin 2 | 28 | 5550 (805) | 163 |
| Example 3 | 20 | 4325 (627) | 167 |

The Examples of the invention exhibit significantly lower viscosities than do the corresponding Base Resins by themselves. The viscosity of Example 2 is less than that of Base Resin 1 by nearly half; Example 3 is about 30% less viscous than Base Resin 2 even though it contains only 14% of the second polysilylated polyether.

Surprisingly, the mixture of polysilylated polyethers results in only small changes in properties when cured. Example 2 has a somewhat higher tensile strength and a small decrease in elongation, compared to the cured Base Resin 1. Example 3 shows a small loss of tensile strength but essentially no change in elongation, compared to Base Resin 2.

Comparative Sample A 197.4 g of Base Resin 1 is heated under nitrogen to 60° C. with stirring. 18.1 g of a 4, 4'-diphenylmethane diisocyanate are added, followed by 26.4 g of 3-aminopropyl trimethoxysilane. The reaction mixture forms solids before all of the silane is added, producing an extremely viscous material that is not pourable.

What is claimed is:
1. A moisture-curable polysilylated polyether composition comprising a mixture of polysilylated polyethers, wherein the mixture comprises
   a) 50 to 95 weight percent, based on the combined weights of a) and b), of one or more first polysilylated polyethers which are free of urea groups, have an average of two or more terminal hydrolysable silyl groups per molecule and have a molecular weight of 4,000 to 20,000, the first polysilylated polyether(s) being a reaction product of a i) linear polyether having a terminal isocyanate group, a terminal hydrolysable silyl group and a number average molecular weight of 250 to 2000 and (ii) a polyether polyol nominally having 2 to 6 hydroxyl groups per molecule and a hydroxyl equivalent weight of 500 to 2500; and
   b) 50 to 5 weight percent, based on the combined weights of a) and b), of one or more second polysilylated polyethers which are free of urea groups, have an average of 1.8 to 4 terminal hydrolysable silyl groups per molecule and have a molecular weight of 1000 to less than 4,000, the second polysilylated polyether(s) being a reaction product of i) a linear monosilylated polyether monol having a terminal hydroxyl group, a terminal hydrolysable silyl group and a molecular weight of 250 to 1500 and ii) a coupling agent having at least two groups reactive with hydroxyl groups and a molecular weight of up to 500.

2. The moisture-curable polysilylated polyether composition of claim 1 which comprises 60 to 90 weight percent of component a) and correspondingly 40 to 10 weight percent of component b) based on the combined weights of components a) and b).

3. The moisture-curable polysilylated polyether composition of claim 2 which has a viscosity of 5 to 50 Pa·s at 25° C.

4. The moisture-curable polysilylated polyether composition of claim 3 wherein component a) is one or more compounds represented by the structure (I):

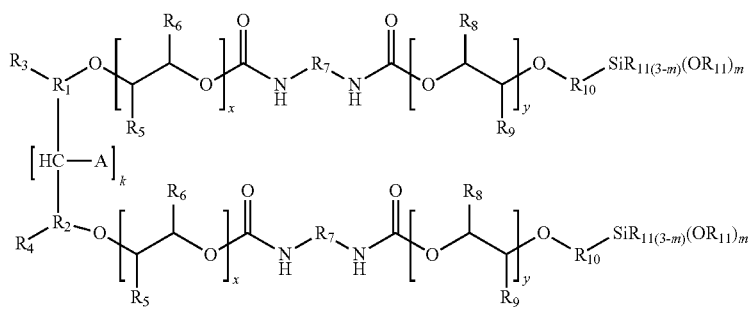

where A is either H or has the structure (II):

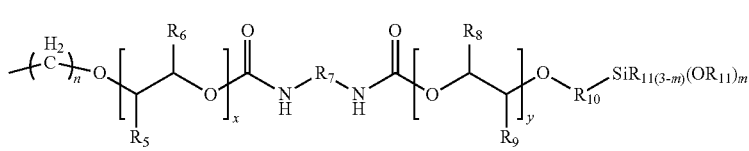

k is a number from 0 to 4, m and n are independently numbers from 0 to 3, the values of x and y are numbers such that the compound has a molecular weight of 4000 to 20,000, $R_1$, $R_2$, $R_{10}$ and $R_{11}$ are independently straight chain or branched alkyl groups having 1 to 4 carbon atoms, $R_3$, $R_4$, $R_5$, $R_6$, $R_8$ and $R_9$ are independently hydrogen or straight chain or branched alkyl groups having 1 to 4 carbon atoms, and R7 is aliphatic, cycloaliphatic, bis-benzylic and/or aromatic and has 2 to 20 carbon atoms.

5. The moisture-curable polysilylated polyether composition of claim 4 wherein component b) is one or more compounds represented by the structure

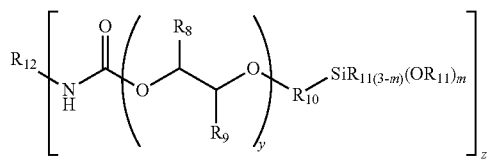

wherein $R_8$, $R_9$, $R_{11}$ are independently straight chain or branched alkyl groups having 1 to 4 carbon atoms, $R_{10}$ is a straight chain or branched alkylene group having 1 to 4 carbon atoms, y is a number such that the molecular weight of the second silylated polyether is 1000 to less than 4000, $R_{12}$ is the residue, after removal of isocyanate groups, of a polyisocyanate having z isocyanate groups and a molecular weight of up to 500, and z has an average value of 1.8 to 4.

6. The moisture-curable polysilylated polyether composition of claim 5 wherein component a) has a molecular weight of 6000 to 13,000 and an average of 3 to 4 hydrolysable silyl groups per molecule.

7. The moisture-curable polysilylated polyether composition of claim 6 wherein component b) has a molecular weight of 1200 to 3000 and an average of 1.8 to 2.5 hydrolysable silyl groups per molecule.

8. A method for making a moisture-curable polysilylated polyether composition of claim 1, comprising the steps of A) forming a mixture of:
  starting material 1): one or more first polysilylated polyethers free of urea groups, having an average of two or more terminal hydrolysable silyl groups per molecule and having a molecular weight of 4,000 to 20,000, the first polysilylated polyether(s) being a reaction product of a i) linear monosilylated polyether isocyanate having a terminal isocyanate group, a terminal hydrolysable silyl group and a molecular weight of 500 to 2000 and (ii) at least one polyether polyol nominally having 2 to 6 hydroxyl groups per molecule and a hydroxyl equivalent weight of 500 to 2500;
  starting material 2): at least one linear monosilylated polyether monol having a terminal hydroxyl group, a terminal hydrolysable silyl group and a molecular weight of 250 to 1500; and
  starting material 3): at least one coupling agent having at least two groups reactive with hydroxyl groups and a molecular weight of up to 500; and
B) reacting starting material 2 and 3) in the presence of starting material 1) to produce a mixture of starting material 1) and at least one second polysilylated polyether having a molecular weight of 1000 to less than 4000 and an average of 1.8 to 4 terminal hydrolysable silyl groups per molecule and corresponding to a reaction product of starting material 2) with starting material 3).

9. A formulated adhesive, sealant, caulking or coating composition comprising the moisture-curable polysilylated polyether composition of claim 1 and at least 5 weight percent, based on the weight of the moisture-curable polysilylated polyether composition, of at least one mineral filler.

10. The formulated adhesive, sealant, caulking or coating composition of claim 9 which contains 10 to 50 weight percent, based on the weight of the moisture-curable polysilylated polyether composition, of the at least one mineral filler.

11. The formulated adhesive, sealant, caulking or coating composition of claim 10, which has a viscosity of 5 to 1000 Pa·s at 25° C.

12. A method for making a moisture-curable polysilylated polyether composition, comprising the steps of
(I) Forming a first reaction mixture containing at least one starting linear monosilylated polyether monol having a terminal hydroxyl group, a terminal hydrolysable silyl group and a molecular weight of 250 to 1500 and at least one diisocyanate and a molecular weight of up to 500, the linear monosilylated polyether monol and polyisocyanate being provided in amounts such that greater than one equivalent of isocyanate groups is provided per equivalent of hydroxyl groups on the linear monosilylated polyether monol;

II) reacting the first reaction mixture from step I to form a reaction product containing i) at least one linear monosilylated polyether isocyanate having a terminal isocyanate group, a terminal hydrolysable silyl group and a molecular weight of 500 to 2000 and ii) a polysilylated polyether having at least two terminal hydrolysable silyl groups and a molecular weight of 1000 to less than 4000, which polysilylated polyether lacks isocyanate groups and corresponds to a reaction product of the polyisocyanate with one molecule of the starting linear polyether per isocyanate group of the stating polyisocyanate;

(III) combining the reaction product formed in step II) with at least one polyether polyol nominally having 2 to 6 hydroxyl groups per molecule and a hydroxyl equivalent weight of 500 to 2500 to form a second reaction mixture, and (IV) reacting the polyether polyol(s) and the linear monosilylated polyether isocyanate in the second reaction mixture in the presence of the polysilylated polyether formed in step II to produce a mixture of polysilylated polyethers.

\* \* \* \* \*